No. 676,201. Patented June 11, 1901.
L. PATRIC.
FRUIT TREE PROTECTOR.
(Application filed June 23, 1899.)
(No Model.) 2 Sheets—Sheet 1.
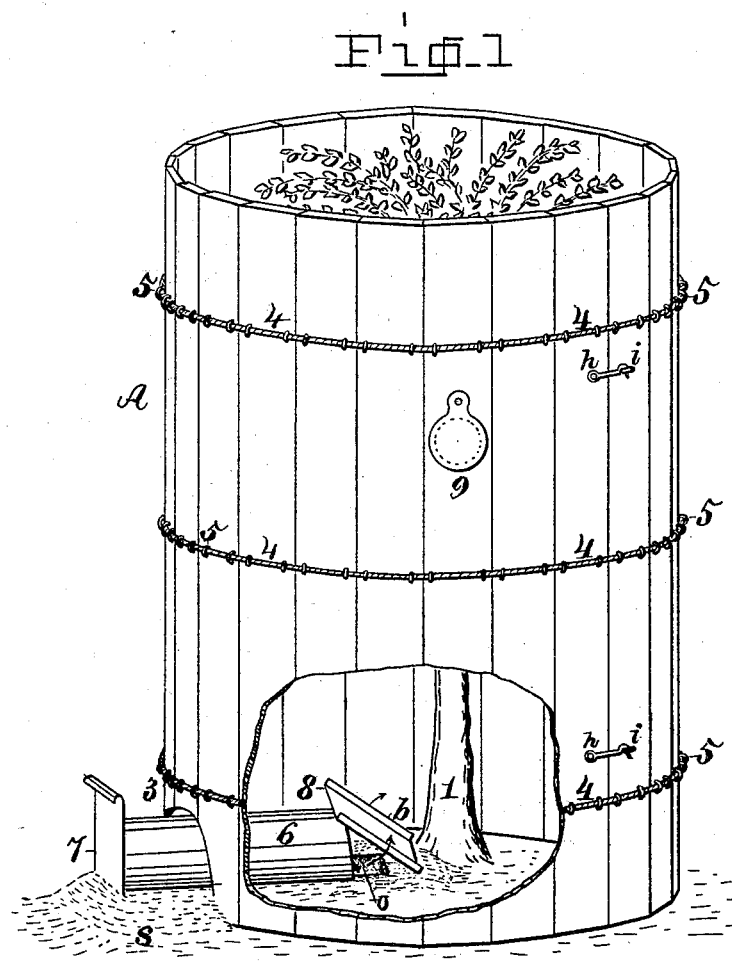

No. 676,201. Patented June 11, 1901.
L. PATRIC.
FRUIT TREE PROTECTOR.
(Application filed June 23, 1899.)
(No Model.) 2 Sheets—Sheet 2.
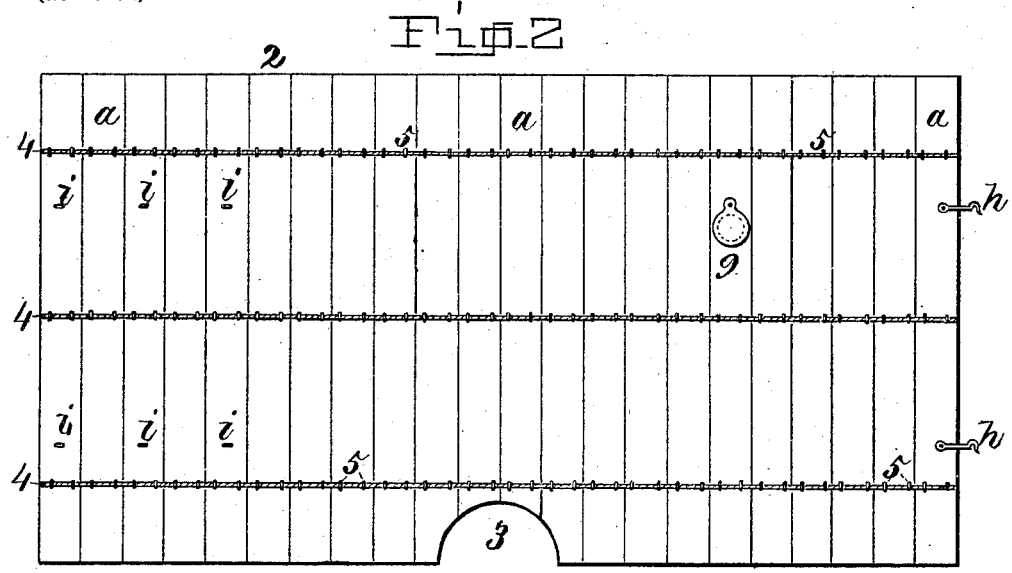
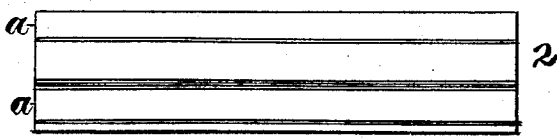
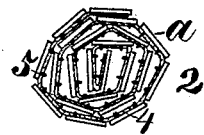
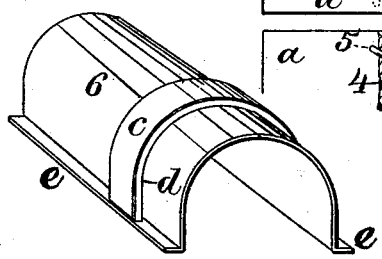
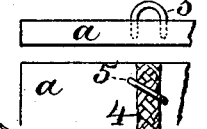
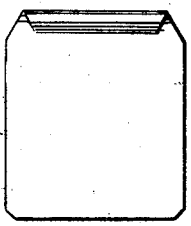
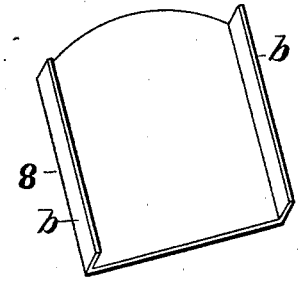
Attest.
Chas. A. Bancroft.
W. J. Converse
Inventor.
Lewis Patric.
B. C. Converse,
Attorney.

UNITED STATES PATENT OFFICE.

LEWIS PATRIC, OF SPRINGFIELD, OHIO.

FRUIT-TREE PROTECTOR.

SPECIFICATION forming part of Letters Patent No. 676,201, dated June 11, 1901.

Application filed June 23, 1899. Serial No. 721,604. (No model.)

*To all whom it may concern:*

Be it known that I, LEWIS PATRIC, a citizen of the United States, residing at Springfield, in the county of Clark and State of Ohio, have invented certain new and useful Improvements in Fruit-Tree Protectors, of which the following is a specification.

My invention relates to an improved fruit-tree protector. The invention applies particularly to trees of the citrus variety—such as oranges, lemons, &c.—which are cultivated in our southern latitudes and which are liable to be injured by frost and cold winds; and its object is to protect the whole tree, including the trunk, branches, and foliage, as well as the superficial roots which grow radially from the base of the trunk at the top of the tap-root and are known among orange-growers as the "crown-roots" and which are common to orange, lemon, and lime trees. These roots are liable to be injured during low temperatures that affect the other parts of the tree, as they grow out just beneath the surface of the ground.

To accomplish the object of my invention, I make use of a heater which is operated in conjunction with an inclosure having a tightly-closed periphery to warm the earth and air within the inclosure, as described in the specification, and which is particularly pointed out and set forth in the claims.

In the accompanying drawings, Figure 1 is a perspective view of my improved tree-protector including the heater and its accessories, which are shown in part through the opening broken out of the cylinder near its lower end. Fig. 2 is a plan view of the sheet of boards (unfolded) which form the cylinder shown in Fig. 1 when bent into shape. Fig. 3 is a side elevation of the same when rolled for transportation, the inside surface being outward. Fig. 4 is an end view of the folded sheet of boards shown in Fig. 3. Fig. 5 shows the position of the staple confining the cord to the board to avoid splitting the latter in driving. Fig. 6 is a perspective view of the heater. A non-conducting sheet is shown over it near the front end. Fig. 7 is a front elevation of the door of the heater, which is operated also as a damper for the latter. Fig. 8 is a perspective view of the deflector-plate of the heater, shown also at the inner end of the heater in Fig. 1. Fig. 9 is an elevation of the non-conducting sheet used over the heater to prevent the wood of the cylinder from being ignited.

In the drawings, 1 is a tree, the top and body of which are partly visible in Fig. 1.

A is the cylinder of boards $a\,a$, which extends from the ground upward to a point above the top of the tree and completely encompassing the latter. These boards are connected edgewise by the plaited cords 4, which latter are attached to the outer side of the boards $a\,a$ by the metal staples 5, driven into the boards over the cords 4. In the detail, Fig. 5, the staple 5 is shown as crossing the cord 4 diagonally to prevent splitting in the board $a$.

2 is a sheet of boards connected together by the cords 4 and the staples 5, securing the cords to the boards, which is first constructed before forming the cylinder shown in Fig. 1. In the construction of the sheet of boards 2 the latter are assembled and laid across parallel bars of iron spaced at the proper distance for the lines of the cords 4, with the outer surface of the boards uppermost and their edges in contact, and are clamped in place by any ordinary clamping device. Lines are then struck across the boards over the middle longitudinal line of the bars beneath them, and the braided cords 4 are then drawn over the lines on the boards $a\,a$ and secured at their ends. The staples 5 are now driven across the cords into the boards $a\,a$, two staples being driven into each board. It will be noticed by reference to Figs. 1 and 2 that the staples 5 are driven a little distance from the edges of the boards $a\,a$. This is done to leave a sufficient length of the cord 4 between the staples where it crosses the edges of the boards $a\,a$ to give flexibility to the sheet 2, so that it may be readily bent into cylindrical form and can be rolled with its inner side out, as shown in Figs. 3 and 4, when required for transportation. It also permits of bending the sheet 2 in a circle for a cylinder of less diameter, for the same reason as before noted.

At the right end of the sheet of boards 2 (shown in Fig. 2) are seen hooks $h\,h$, pivoted near the outer edge of the end board $a$. These hooks engage the screw-eyes or staples $i\,i$ (seen upon the opposite end of the sheet 2) in the same horizontal plane in increasing or reducing the size of the cylinder A to adapt it to that of the tree. The cords 4 operate as hoops to support the cylinder A, and at the same time by their pliability allow the sheet of boards 2 to be rolled with its reverse side out, as before stated.

The heater 6 is made in the simplest form, consisting of a single sheet of metal to form the body of rectangular shape, which is bent into a semicylindrical form, as shown in the views, Figs. 1 and 6. Its sides at their lower edges are turned at right angles outward to form the flanges $e\ e$, on which it rests and which also serve to support the earth with which the heater is wholly or partially covered. A band $c$ of metal extends over the body of the heater 6, and between the band $c$ and the body or shell 6 is a band $d$ of non-conducting material, as asbestos, felt, or similar substance, to prevent the ignition of the boards $a\ a$ of the cylinder A around the opening 3, through which the heater 6 extends from the outside into the space surrounding the tree 1 within the cylinder. The opening 3 is cut out from the boards $a\ a$ on one side of the cylinder at its base in the form of an arch at its top part to admit of the introduction of the heater 6 the required distance into the cylinder A. The door 7 of the heater 6 is a flat square sheet of metal having its upper corners cut off and the top edge bent into a scroll, as seen in Fig. 7. It is inserted into the earth when the heater is set and is supported in an upright position against the front end of the heater 6 by banking the earth against it, as shown in Fig. 1, where $s$ represents the earth. The deflector 8 is constructed of a plain sheet of metal of square or nearly square form and having side flanges $b$ turned at right angles upward from its lateral edges, as shown in Figs. 1 and 2. The object of the deflector 8 is to prevent the currents of heated air generated by the fuel in the heater 6 from passing out of the inner end of the latter directly toward the tree 1, and for this purpose the deflector is set in the inclined position shown in Fig. 1, with its inner end resting upon the ground in front of the tree 1, at a little distance from the latter, and its opposite end laid upon the inner end of the heater 6.

In preparing the protector for operation a small trench is first made in the ground crossing a circular line drawn on the latter around the tree 1 of a size to conform to that of the cylinder to be used, the heater 6 is then set over the excavation forming the trench $o$, which is dug out the length of the heater 6, extending gradually to a less depth at the inner end, where it inclines upward under the inclined deflector-plate 8, as seen in Fig. 2. The heater 6 is set with its flanges $e\ e$ about four inches below the surface of the ground, the deflector 8 placed in an inclined position on its inner end, and is loaded with earth, which is also banked up over the heater, only a small aperture being left for the heated-air currents to pass out on either side of the deflector 8. The fuel being introduced into the heater and ignited, the door 7 is thrust down into the earth at the front end of the heater and the earth banked against it. By proper tests the amount of fuel necessary to generate the required amount of heat can be ascertained, and as the earth under and around said heater and deflector, as well as over them, becomes heated there will be formed a storage of the heat in the earth within the cylinder, which will be gradually imparted to the air in the latter with the use of but a minimum amount of fuel after the temperature has been raised to the proper degree. Opening 9 is provided for testing the temperature within the cylinder.

In the construction of the cylinder A, Fig. 1, I do not confine myself to the use of cords only, as any other material of like pliability may be used, and these cords or equivalent material afford sufficient elasticity in a sheet of this length to permit it to be bent into the required cylinder and at the same time relax when the sheet is opened or rolled in the reverse direction for transportation. This elasticity insures a tight and rigid cylinder, so important to the success of the device.

I claim—

1. In a tree-protector a cylinder consisting of boards having abutting edges, elastic cords connecting said boards, staples inserted in each of said boards upon either side of the longitudinal line of the latter over each cord; said cylinder having an open top, an archway at its bottom and a heater introduced through said archway, its front end outside, substantially as described.

2. In a tree-protector, the combination with an open-topped cylinder composed of upright boards secured together by elastic cords the edges of the boards being in contact, and provided with an archway at its base, of means for warming the earth and air within said cylinder, said means consisting of a semicylindrical heater projected through said archway and having a deflector provided with upright flanges inclined upon its inner end, and a door adapted to operate as a damper at the outer end, substantially as and for the purpose specified.

3. In a tree-protector, the combination with a cylinder composed of boards abutted edge to edge, and secured by elastic cords, said cylinder being provided with means for enlarging and diminishing its size, of a heater projected through an archway cut out of the cylinder at its base, from the outside to the interior of said cylinder, the heater provided with a protective band of non-conducting material, a deflector inclined upon the inner end of said heater, and a door at its outer end operative also as a damper, said heater and its attachments having a covering of earth to facilitate the process of slow combustion, the storage of heat within said cylinder, and its gradual diffusion into the earth and air inclosed therein, substantially as described.

4. A tree-protector consisting of a cylinder of closely-joined boards having an open top end, and an archway opening into its base, in combination with a heater projecting through said archway from the outer side of said cylinder into the interior of the latter, said heater having a deflector on its inner end, and a door at its outer end, operating also as a damper, said heater and deflector being covered with earth preparatory to charging the heater with fuel and operated to warm the earth and air within the cylinder, substantially as described.

5. In a tree-protector operated by warm air, the combination with an inclosure for the protection of the trunk, crown roots and branches of the tree, consisting of a tight-walled cylinder hooped by elastic cords which has an archway cut out at its base, of a semicylindrical heater having horizontal flanges turned outward from its sides at their lower edges, and projecting from the outside through said archway into the interior of said cylinder, a deflector having side flanges thereon inclined from the ground upon the inner end of said heater, and a door, operative also as a damper, at the outer end, a band of non-conducting material and a metal band over the latter spanning said heater within the archway, said heater and its accessory parts being covered with earth before charging said heater with fuel, substantially as described.

6. In a tree-protector, a cylinder constructed of boards having abutting edges, and elastic cords connecting said boards and secured thereto near the middle longitudinal line of the latter, in combination with a heater projected endwise from the outer side through an archway into the interior of said cylinder, a deflector for the heater provided with flanges inclined upon its inner end, and a door at the outer end of the heater adjustable as a damper, said heater and its accessory parts having a covering of earth, substantially as and for the purpose described.

7. In a tree-protector, a cylinder constructed of boards closely joined at their edges by elastic cords encircling said cylinder and secured thereto near the middle line of the boards, in combination with a heater projected through an archway into the interior of said cylinder, a band of non-conducting material over said heater, within said archway, a deflector at the inner end of said heater, and a door at its outer end operating also as a damper, said heater and deflector having a covering of earth, substantially as described.

8. The combination in a tree-protector, of a cylinder composed of boards with abutting edges, connected by elastic cords secured to each board near its middle longitudinal line by a pair of staples, said cylinder having an archway on one side of its base at the ground-line, a heater projected therethrough, and a non-conducting band spanning said heater within said archway, said heater having a deflector provided with upright flanges at its inner end, and an adjustable door at its outer end, and operated with a covering of earth, substantially as described.

In testimony whereof I affix my signature in presence of two witnesses.

LEWIS PATRIC.

Witnesses:
AMOS WOLFE,
M. D. CONSIDINE.